US010586443B2

(12) United States Patent
Lutz

(10) Patent No.: US 10,586,443 B2
(45) Date of Patent: Mar. 10, 2020

(54) OPERATING SYSTEM AND METHOD FOR CHECKING A RELATIONSHIP BETWEEN A PROCESS ALARM OF A PROCESS OBJECT DISPLAYED VISUALLY ON AN OPERATOR CLIENT OF A PROCESS CONTROL SYSTEM AND OUTPUT ACOUSTICALLY

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/275,662

(22) Filed: Feb. 14, 2019

(65) Prior Publication Data

US 2019/0259269 A1      Aug. 22, 2019

(30) Foreign Application Priority Data

Feb. 16, 2018  (EP) ..................................... 18157239

(51) Int. Cl.
| | |
|---|---|
| *G08B 29/00* | (2006.01) |
| *G08B 29/12* | (2006.01) |
| *G06F 3/16* | (2006.01) |
| *G06F 3/14* | (2006.01) |

(52) U.S. Cl.
CPC ............... *G08B 29/12* (2013.01); *G06F 3/14* (2013.01); *G06F 3/165* (2013.01)

(58) Field of Classification Search
CPC ............ G08B 29/12; G06F 3/14; G06F 3/165

USPC .................................... 340/506, 501; 700/80
See application file for complete search history.

(56) References Cited

U.S. PATENT DOCUMENTS

| | | | | |
|---|---|---|---|---|
| 2006/0294565 | A1* | 12/2006 | Walter | ..................... A63F 13/12 |
| | | | | 725/108 |
| 2008/0208373 | A1 | 8/2008 | Thurau | |
| 2012/0119901 | A1 | 5/2012 | Hollender et al. | |
| 2017/0070563 | A1* | 3/2017 | Sundermeyer | ........ H04L 67/025 |
| 2018/0129785 | A1* | 5/2018 | Pal | .......................... G16H 40/40 |

FOREIGN PATENT DOCUMENTS

| | | |
|---|---|---|
| EP | 1950639 | 7/2008 |
| WO | WO2010/130343 | 11/2010 |

* cited by examiner

*Primary Examiner* — Tai T Nguyen
(74) *Attorney, Agent, or Firm* — Cozen O'Connor

(57) ABSTRACT

A method for checking the relationship between a process alarm of a process object displayed visually on an operator client of a process control system and output acoustically, wherein an operator server of the process control system is provided with an alarm message component for preparing process alarms to be output acoustically and for transmitting these process alarms to an alarm output, and is provided with an alarm display component for preparing process alarms to be output visually and for transmitting these process alarms to the operator client, on which the process alarms can be displayed, where the output of the respective acoustic process alarms can be deactivated via an operator input on the operator client such that an operator can determine at any time whether an inconsistency is present between an alarm output acoustically and visually.

4 Claims, 3 Drawing Sheets

OPERATING SYSTEM AND METHOD FOR CHECKING A RELATIONSHIP BETWEEN A PROCESS ALARM OF A PROCESS OBJECT DISPLAYED VISUALLY ON AN OPERATOR CLIENT OF A PROCESS CONTROL SYSTEM AND OUTPUT ACOUSTICALLY

BACKGROUND OF THE INVENTION

1. Field of the Invention

The invention relates to an operator system and a method for checking the relationship between a process alarm of a process object displayed visually on an operator client of a process control system and output acoustically.

2. Description of the Related Art

In process control technology, particularly within the scope of the operation and monitoring of process systems, graphic displays are provided for process objects, e.g., process objects in the form of measuring points, tanks, valves, sensors, actuators, where the graphical displays associated with these process objects, such as displays in the form of image symbols of a system image, block symbols for process object monitoring, faceplates for process object operation, sequence of events displays and/or image hierarchies dynamized with group alarms, . . . , are shown on an operator client of an operator system. In the event that an operator is to be notified of a process alarm of a process object, this alarm can be provided to the operator both visually, e.g., as what is known as an "alarm banner" on the operator client and also acoustically in the form of an alarm tone by way of a suitable output device. In such cases, the operator can mute the alarm tone, by the operator selecting what is known as an "alarm annunciator mute" button displayed on the operator client in the upper monitor area adjacent to the alarm banner of the operator client. If the operator mutes the recently output alarm tone of an active alarm from a first point in time to (n=1, 2, . . . ) because the operator acknowledged the alarm, for instance, then the alarm tone of a further active alarm activated from a second point in time $t_{n-1}$ (n=1, 2, . . . ) will be played back or output immediately. An active alarm is understood to mean an alarm that has not yet been acknowledged by an operator, because the operator has not yet processed this alarm, for instance, or has not yet taken any suitable measures with respect to a suitable process operation on account of this alarm.

A visually output alarm banner and an output alarm tone are typically consistent with one another, which means that the output alarm tone "matches" with the alarm shown in the alarm banner. It may occur, however, that a number of active alarms occur and a number of operators "mute" the associated alarm tones, even though the alarms are not yet processed and acknowledged. This can rapidly result in an inconsistency between the output alarm tone and the displayed alarm banner, which means that an operator hears an alarm tone that does not "match" or "is not consistent" with the alarm banner displayed and that can also not be located. On account of this, the operator cannot find the process object that caused the alarm and thus the alarm tone, until all previously muted alarms are processed and acknowledged. The operator is also unable to foresee the point in time at which the process object is found, if the inconsistency only occurs once.

EP 1 950 639 A1 discloses a method for operating a process system, in which a number of items of alarm information for showing inappropriate operating procedures is generated on a process level.

WO 2010/130343 A2 discloses an alarm management system and a method associated therewith for managing alarm messages from measured values, process variables and/or status messages of a technical system or a technical process.

SUMMARY OF THE INVENTION

In view of the foregoing, it is an object of the present invention to provide an operation system and a method via which an operator can determine at any time whether an inconsistency is present between a process alarm output acoustically and visually.

This and other objects and advantages are achieved in accordance with the invention by a method in which an alarm display component is queried by the alarm message component to determine which process alarm is currently output visually, where the alarm message component is used to check whether the process alarm currently output visually deviates from the process alarm currently output acoustically and the deviation is shown on the operator client.

The objects are also achieved in accordance with the invention by an operator system in which the alarm message component is configured to query the alarm display component to determine which process alarm is currently output visually, check whether the process alarm currently output visually deviates from the process alarm currently output acoustically and to receive and show the deviation transmitted by the alarm message component.

It is advantageous that the requirement for a more efficient and improved alarm management is created, as a result of which in particular the availability of a process system can be increased.

In one embodiment of the invention, it is possible for an operator to monitor and operate the process object emitting and generating the alarm at any time, which shows or forms the source of the acoustically output process alarm.

It should be noted here that a process object has a number of associated facets. For instance, a process image of a server of an operator system comprises process image modules associated with these process objects or operation- and monitoring-relevant process data of these process objects, an automation device comprises automation modules or control modules (CFCs, SFCs, . . . ) associated with the process objects and furthermore a user interface of a client of the operator system has block symbols of a system image associated with the process objects as well as what are known as faceplates, where the system images are provided for process monitoring and the faceplates are provided for process management or process operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawing in which an exemplary embodiment of the invention is illustrated, in which.

DETAILED DESCRIPTION OF THE EXEMPLARY EMBODIMENTS

Figure 1:
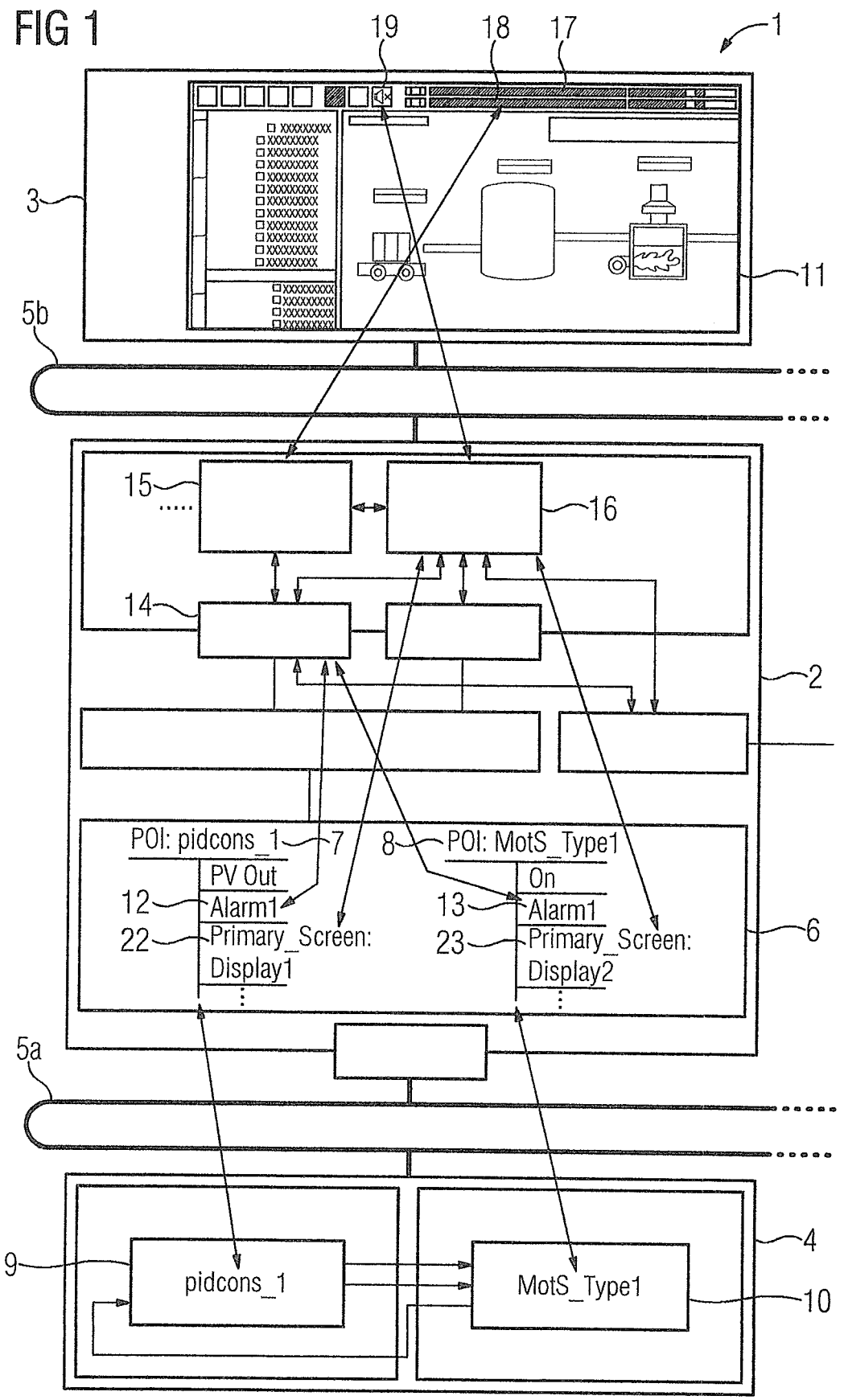
FIG. 1 shows components of a control system in accordance with the invention.

The same parts shown in FIGS. 1 to 4 are provided with the same reference characters.

Components of a process control system which, in the present exemplary embodiment, comprise an operator server 2 and an operator client 3 and an automation device 4, are designated with reference numeral 1 in FIG. 1. It should be understood the process control system can have a plurality of automation devices which, on the one hand, are connected via a plant bus 5a to the operator server 2 and, on the other hand, via a further bus (not shown) to decentralized peripherals, to which a plurality of field devices (sensors, actuators) are connected. Furthermore, an operator server 2 and an operator client 3 are only shown in the present example. Further, it should be understood operator servers and operator clients can also be provided, where typically an operator server and an operator client each form an operator system and an operator station and the operator clients and the operator servers are connected to a terminal bus 5b.

As mentioned, graphical displays are provided for process objects in process control technology particularly within the scope of the operation and monitoring of process systems, where process objects have process objects in the form of measuring points, tanks, valves, sensors, actuators, a number of facets, for instance. A process image 6 of the operator server 2 of the operator system therefore has process image modules 7, 8 associated with process objects, for instance, the automation device 4 has automation modules 9, 10 associated with these process objects and furthermore a user interface 11 of the operator client 3 has faceplates and block symbols that can be displayed in a system image and are associated with these process objects. The block symbols are provided for monitoring parameters and process values of the process objects, the system image is provided for process monitoring and the faceplates are provided for process management and process operation, where an operator can change the parameters of the process objects within the scope of the process management and process operation using the faceplate.

The operator server 2 is configured to reproduce all alarms of the respective process objects, which sound during the process control, onto an alarm tag 12, 13 of the process image module 7, 8 of the process image 6 that is associated with the respective process object. These alarms indicate process malfunctions and are transmitted via the automation modules 9, 10 of the automation device 4 to the operator server 2, which stores the alarms in its memory 14.

In the present exemplary embodiment, the operator server 2 has an alarm display component in the form of an alarm banner component 15 and an alarm message component in the form of an alarm annunciator component 16, which reads each alarm stored in the memory 12. The alarm banner component 15 prepares the read-out alarms to form process alarms to be output or displayed visually, and the alarm annunciator component 16 prepares the read-out alarms to form process alarms to be output acoustically. The alarm banner component 15 transmits the respectively prepared alarm to the user interface 11, which is configured to process the prepared alarm for display on the operator client 3. In the present example, alarm banners 17, 18 that represent the active (still unacknowledged) alarms output or displayed visually are shown on the operator client 3. Accordingly, the alarm annunciator component 16 transmits the prepared process alarm to be output acoustically to a suitable (acoustic) output device, which outputs alarm tones assigned to these alarms. Moreover, the alarm annunciator component 16 transmits prepared data for displaying a mute button 19 and a loop-in button 20 to the user interface 11, where these buttons 19, 20 are arranged adjacent to the alarm banner 17, 18. The loop-in button 20 is, as shown again below, only then faded in if the currently displayed alarm banner does not match the acoustically output alarm tone and an inconsistency is therefore present between the visually output and acoustically output process alarm. In the event that the operator activates the mute button 19, by the operator selecting this mute button 19, such as using a mouse, the annunciator component 16 mutes the correspondingly just output alarm tone where, to this end, this component 16 deactivates the correspondingly prepared process alarm to be output acoustically.

In order to determine or check whether the process alarm just output visually deviates from the process alarm just output acoustically, the annunciator component 16 interrogates the alarm banner component 15 as to which alarm the alarm banner component 15 is currently preparing for a visual display. In the event that the annunciator component 16 identifies that the alarm currently prepared by the alarm banner component 15 and therefore output visually deviates from the alarm prepared by the annunciator component 16 and therefore currently output acoustically, the annunciator component 16 activates the loop-in button 20 for display on the operator client 3. By displaying or showing the loop-in button 20, the operator is notified of the deviation, as a result of which the operator identifies that the currently displayed alarm banner does not match the acoustically output process alarm or the alarm tone to be output. There is therefore an inconsistency between the process alarm output visually and acoustically.

Figure 2:
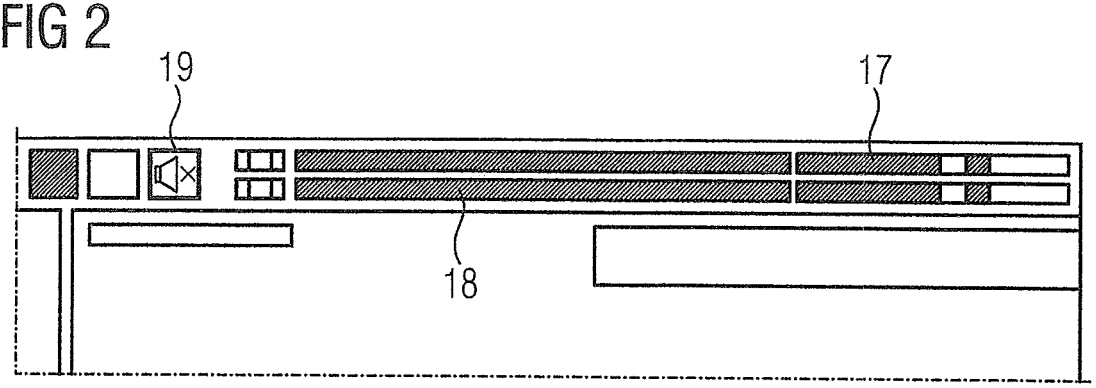
FIGS. 2 to 4 show alarm displays on an operator client in accordance with the invention.
Figure 3:
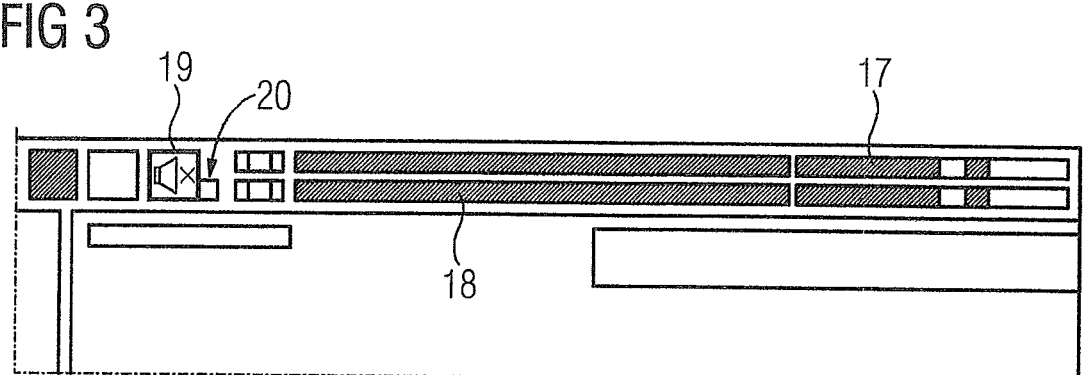
Figure 4:
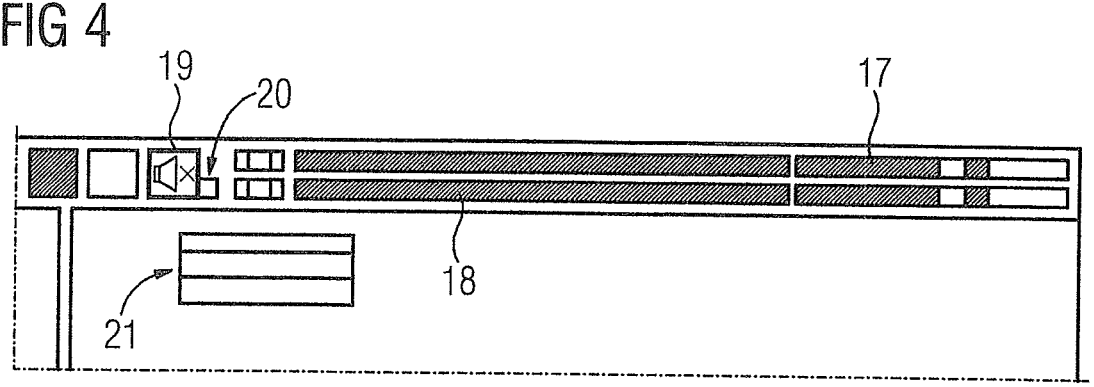

Reference is made below to FIGS. 2 to 4, in which the alarm banners 17, 18 are shown on the operator client 3, which represent the alarms output or displayed visually, where these alarms, as mentioned, are not yet processed and acknowledged by the operator and where the alarm banner 17 shows the most up-to-date active alarm prepared from a point in time $t_n$ (n=1, 2, . . . ) and the alarm banner 18 shows the further currently prepared alarm which is active from a point in time $t_{n-1}$ (n=1, 2, . . . ).

Here, it is initially assumed that the operator has muted the acoustically output alarm associated with the alarm banner 17, which is shown to the operator via the mute button 19 (alarm tone switched off) (FIG. 2). The loop-in button 20 is not activated and faded in, which indicates to the operator that the alarm output visually and acoustically are consistent with one another.

It may occur that the operator mutes an alarm tone, e.g., the alarm tone of the most up-to-date active alarm without acknowledging this alarm. In the present example, it is assumed that the operator switches off the alarm tone for the not yet acknowledged alarm (active from time instant $t_n$), which is displayed visually via the alarm banner 17 (FIG. 3). As a result of this alarm tone being muted, the alarm tone of the next active alarm sounds (active from the point in time $t_{n-1}$), which is displayed visually in the present example via the alarm banner 18. In other words, an alarm tone of an alarm that belongs to the visually output alarm banner 18 or is assigned to the alarm banner 18 is output to the visually output alarm (alarm banner 17), as a result of which inconsistency prevails or is present. In order to show this inconsistency to the operator, the annunciator component 16 is used to activate the loop-in button 20 and to fade it in onto the operator client 3 and the deviation of the currently visually output alarm from the currently acoustically output alarm is therefore shown on the operator client 3.

In order to enable the operator to be able to monitor and operate the process object, producing or generating the alarm at any time, which shows or forms the source of the acoustically output process alarm, a system image specification 22, 23 is entered in the process image modules 7, 8 associated with the process objects in each case, which indicates the system image in which the respective process object outputs alarms. The annunciator component 16 is configured to read out the system image specifications 22, 23 from the process image modules 7, 8 generating the respective alarm and producing the alarm tone, where on account of the system image specifications 22, 23, the display of the system image, of parts of the system image, of a block symbol associated with the process object and/or a faceplate associated with the process object is triggered on the operator client 3 if/when the operator selects the loop-in button 20 of the operator client 3 showing the deviation using a mouse, for instance.

In the present example (FIG. 4), after selecting or actuating the loop-in button 20, despite an inconsistency between the alarm output visually and acoustically, a block symbol 21 is faded in the system image or graphically highlighted among the plurality of block symbols in the system image, which system image represents the process object producing the alarm tone and which is provided for the process monitoring. As a result of the fading-in within the system image, the process object generating or outputting the alarm tone is located. In the event that no block symbol is provided for this process object, a faceplate associated with this process object is faded in or opened for process operation.

An alarm message component that can be correlated is produced using the measures described, where an operator can determine at any time whether an inconsistency is present between an alarm output acoustically and visually. Furthermore, an operator can navigate to the source of an alarm tone, i.e., to the process object producing the alarm, at any time, even in the event of an inconsistency between an alarm output acoustically and visually. The operation and monitoring of process systems is improved in the context of "alarm management", as a result of which the availability of a process system is increased.

Figure 5:
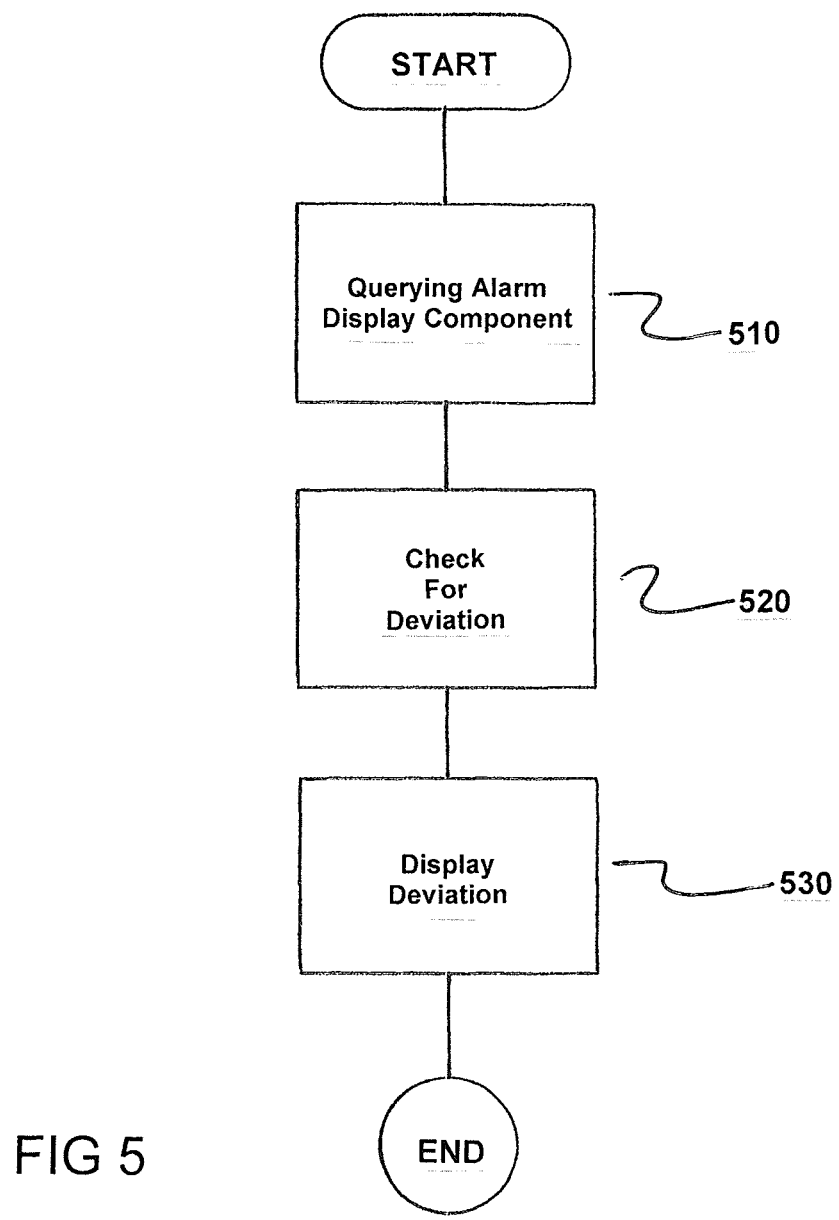
FIG. 5 is a flowchart of the method in accordance with the invention.

FIG. 5 is a flowchart of the a method for checking the relationship between a process alarm of a process object displayed visually on an operator client 3 of a process control system 1 and output acoustically, where an operator server 2 of the process control system 1 includes an alarm message component 16 for preparing process alarms to be output acoustically and for transmitting these process alarms to an alarm output, and includes an alarm display component 15 for preparing process alarms to be output visually and for transmitting these process alarms to the operator client 3, on which the process alarms can be displayed, and wherein an output of respective acoustic process alarms is deactivateable via an operator input on the operator client 3.

The method comprises querying the alarm display component 15 by the alarm message component 16 to determine which process alarm is currently output visually, as indicated in step 510.

Next, the alarm message component 16 is utilized to check whether the process alarm currently output visually deviates from the process alarm currently output acoustically, as indicated in step 520.

Next, the deviation is displayed on the operator client 3, as indicated in step 530.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for checking a relationship between a process alarm of a process object displayed visually on an operator client of a process control system and output acoustically, wherein an operator server of the process control system includes an alarm message component for preparing process alarms to be output acoustically and for transmitting these process alarms to an alarm output, and an alarm display component for preparing process alarms to be output visually and for transmitting these process alarms to the operator client, on which the process alarms can be displayed, and wherein an output of respective acoustic process alarms is deactivateable via an operator input on the operator client, the method comprising:

querying the alarm display component by the alarm message component to determine which process alarm is currently output visually;

utilizing the alarm message component to check whether the process alarm currently output visually deviates from the process alarm currently output acoustically; and displaying the deviation on the operator client.

2. The method as claimed in claim 1, further comprising:

entering a system image specification into process image modules of a process image stored in the operator server, associated with the process objects, which indicates a system image in which a respective process object produces an alarm tone; and utilizing the alarm message component to read out the system image specifications from the process image modules generating the respective alarm;

wherein on account of the system image specifications, a display of a system image, of parts of the system image, of a block symbol associated with the process object producing at least one of (i) an alarm tone and (ii) a faceplate associated with the process object on the operator client is triggered when an operator selects a button of the operator client which shows the deviation.

3. An operator system for a process control system, having an operator server and an operator client, the operator server comprising:

an alarm message component for preparing process alarms to be output acoustically and for transmitting these process alarms to an alarm output;

an alarm display component for preparing process alarms to be output visually and for transmitting said process alarms to the operator client, on which the process alarms can be displayed;

wherein each output of respective acoustic process alarms is deactivateable via an operator input on the operator client;

wherein the alarm message component is configured to query the alarm display component to determine which process alarm is currently output visually;

wherein the alarm message component is configured check whether the process alarm currently output visually deviates from a process alarm currently output acoustically; and wherein the operator client is configured to receive and show the deviation transmitted by the alarm message component.

4. The operator system as claimed in claim 3, wherein a system image specification is entered into the process image modules, associated with process objects, of a process image stored in the operator server, which indicates a system image in which a respective process object produces an alarm tone; and wherein the alarm message component is configured to read out the system image specifications from process image modules generating a respective alarm and to transmit the same to the operator client;

wherein on account of the system image specifications, a display of a system image, of parts of the system image, of a block symbol associated with at least one of (i) the process object and (ii) a faceplate associated with the process object on the operator client is triggered when an operator selects a button of the operator client which shows the deviation.

* * * * *